(12) United States Patent
Santarelli

(10) Patent No.: US 9,348,152 B2
(45) Date of Patent: *May 24, 2016

(54) EYEGLASSES

(71) Applicant: FORTUNA URBIS SRL, Rome (IT)

(72) Inventor: Paola Santarelli, Rome (IT)

(73) Assignee: FURTUNA URBIS SRL, Rome (IT)

( * ) Notice: Subject to any disclaimer, the term of this patent is extended or adjusted under 35 U.S.C. 154(b) by 82 days.

This patent is subject to a terminal disclaimer.

(21) Appl. No.: 14/356,283

(22) PCT Filed: Oct. 31, 2012

(86) PCT No.: PCT/IB2012/056047
§ 371 (c)(1),
(2) Date: May 5, 2014

(87) PCT Pub. No.: WO2013/064993
PCT Pub. Date: May 10, 2013

(65) Prior Publication Data
US 2014/0268018 A1 Sep. 18, 2014

(30) Foreign Application Priority Data
Nov. 3, 2011 (EP) .................................. 11187743.7

(51) Int. Cl.
*G02C 1/00* (2006.01)
*G02C 11/04* (2006.01)

(52) U.S. Cl.
CPC ...................................... *G02C 11/04* (2013.01)

(58) Field of Classification Search
CPC ........ G02C 11/04; G02C 5/006; G02C 11/10; A45C 11/04
USPC .......................... 351/158, 41; 362/103; 206/5
See application file for complete search history.

(56) References Cited

U.S. PATENT DOCUMENTS

| 2,196,543 | A | 4/1940 | Anderson |
| 2,964,613 | A | 12/1960 | Schecter |
| 7,699,486 | B1 | 4/2010 | Beiner |
| 7,938,553 | B1* | 5/2011 | Beiner .................... G02C 11/04 351/158 |
| 8,491,118 | B2* | 7/2013 | Waters .................... G02C 11/04 351/158 |

(Continued)

FOREIGN PATENT DOCUMENTS

| CN | 201522600 U | 7/2010 |
| JP | 09017204 A | 1/1997 |

OTHER PUBLICATIONS

International Search Report (PCT/ISA/210) and Written Opinion (PCT/ISA/237) for corresponding PCT International Application No. PCT/IB2012/056047 filed on Oct. 31, 2012, completed on Jan. 10, 2013, and mailed on Jan. 17, 2013.

(Continued)

*Primary Examiner* — Hung Dang
(74) *Attorney, Agent, or Firm* — Heslin Rothenberg Farley & Mesiti P.C.; Victor A. Cardona, Esq.

(57) ABSTRACT

Eyeglasses, in particular for reading, includes integrated lighting means and corresponding means for activation and de-activation of the lighting means which comprise a gyroscopic sensor of the micro-electromechanical type provided for fading automatically an intensity of the light emitted by the lighting means when, in use, the eyeglasses are moved angularly upwards with respect to a reference position.

15 Claims, 2 Drawing Sheets

(56) References Cited

U.S. PATENT DOCUMENTS

| | | |
|---|---|---|
| 2007/0013865 A1 | 1/2007 | Jordan |
| 2008/0273166 A1 | 11/2008 | Kokonaski et al. |
| 2010/0302502 A1 | 12/2010 | Ahn |
| 2011/0013135 A1 | 1/2011 | Waters |
| 2011/0187989 A1 | 8/2011 | Waters |

OTHER PUBLICATIONS

Chinese First Office Action dated Mar. 31, 2015 for Patent Application No. 201280065900.3, with translation.

* cited by examiner

EYEGLASSES

CROSS REFERENCE TO RELATED APPLICATIONS

This application is a national stage of PCT International Application No. PCT/IB2012/056047, filed on Oct. 31, 2012, and published in English on May 10, 2013, as WO 2013/064993 AI, which claims priority from European Application No. 11187743.7 filed on Nov. 3, 2011, the entire disclosures of which are incorporated herein by reference.

This application is also related to co-owned U.S. patent application Ser. No. 14/356,276 filed concurrently herewith on May 5, 2014, also entitled "EYEGLASSES", which is a national stage of PCT International Application NO, PCT/IB2G12/056045, filed on Oct. 31, 2012, and published in English on May 10, 2013, as WO 2013/064991 AI, which claims priority from European Application No. 11187758.5 filed on Nov. 3, 2011 the entire disclosure of which is incorporated herein by reference.

This application is also related to co-owned U.S. patent application Ser. No. 14/356,309 filed concurrently herewith on May 5, 2014, also entitled "EYEGLASSES", which is a national stage of PCT International Application No. PCT/IB2012/056049, filed on Oct. 31, 2012, and published in English on May 10, 2013, as WO 2013/064995 AI, which claims priority from European Application No. 11187752.8 filed on Nov. 3, 2011, the entire disclosure of which is incorporated herein by reference.

FIELD OF THE INVENTION

The present invention relates in general to eyeglasses, in particular of the type with graduated lenses for reading.

STATE OF THE PRIOR ART

There have already been proposed, for example in the documents Nos. U.S. Pat. No. 7,699,486, U.S.-2007/0013865, and U.S.-2011/013135, eyeglasses of this type provided with integrated lighting means for emitting light, and hence enabling reading, even in poorly illuminated environments, such as theatres, aeroplanes, cinemas, meeting rooms, or similar contexts.

In these known solutions, activation and de-activation of the lighting means integrated in the eyeglasses are normally manual; i.e., they require operation of one or two switches, in the case where independent lighting means are provided for each arm or for each side of the front. There follows the problem that, in the case where the user, when he is reading with the lighting means activated, lifts his head towards a person to whom he is speaking, the latter gets dazzled, with consequent discomfort.

In an attempt to solve this problem, in the Japanese patent document No. JP-9017204 it has been proposed to equip the lighting means integrated in the eyeglasses with an anti-dazzle system designed to cause automatic de-activation thereof in certain conditions. This document, however, does not describe or suggest any technical solution able to implement said function of automatic switching-off in so far as it is limited simply to proposing the idea without explaining how it can be implemented.

U.S. Pat. Nos. 2,196,543 and 2,964,613 disclose eyeglasses corresponding to the pre-characterizing part of claim 1, wherein the means for activation and deactivation of the light means of the eyeglasses consists of an on-off mercury switch: the light is switched on when the eyeglasses worn by the user is moved downwardly and is switched off when the eyeglasses are again moved upwards.

U.S.-2008/273166 discloses an eyeglasses frame provided with a micro gyro, i.e. a gyroscopic micro-sensor controlling an electro-active lens. Even in this case the sensor operates in an on-off fashion: the lens is activated, for instance in terms of different focus or tint, when the wearer's head moves to a first position angled steeply down relative to the horizon, and once activated remains on until the wearer's head moves to a second position at an angle slightly above the horizon.

SUMMARY OF THE INVENTION

The object of the present invention is hence to provide a solution that is simple, functional, and effective for translating into practice the idea of automatic switching-off of the lighting means with the aim of preventing the situations of dazzling referred to above.

According to the invention, the above object is achieved thanks to the fact that the eyeglasses further comprise control means of the gyroscopic-inclinometer type configured for fading automatically the intensity of the light emitted by the aforesaid lighting means when, in use, the eyeglasses are moved angularly upwards with respect to a reference angular position.

Thanks to this idea of solution, it is hence possible to manage automatically, as a function of the position in space of the eyeglasses worn by the user, a progressive fading of the light emitted by the lighting means, which conveniently proceeds as far as an angular position of complete switching-off or of minimum light intensity.

The reference angular position and the angular position of switching-off or of minimum intensity can advantageously be set via a manual selector, and the angular range between said positions may be, for example, in the region of 30°-40° or more.

According to the preferred embodiment of the invention, the lighting means comprise a pair of LEDs (light-emitting diodes), which surface in front of the end where each arm is articulated to the front and are set on top of one another so as to generate an appreciably wide lighting range.

BRIEF DESCRIPTION OF THE DRAWINGS

The invention will now be described in detail with reference to the annexed drawings, which are provided purely by way of non-limiting example, and in which.

DETAILED DESCRIPTION OF THE INVENTION

Figure 1:
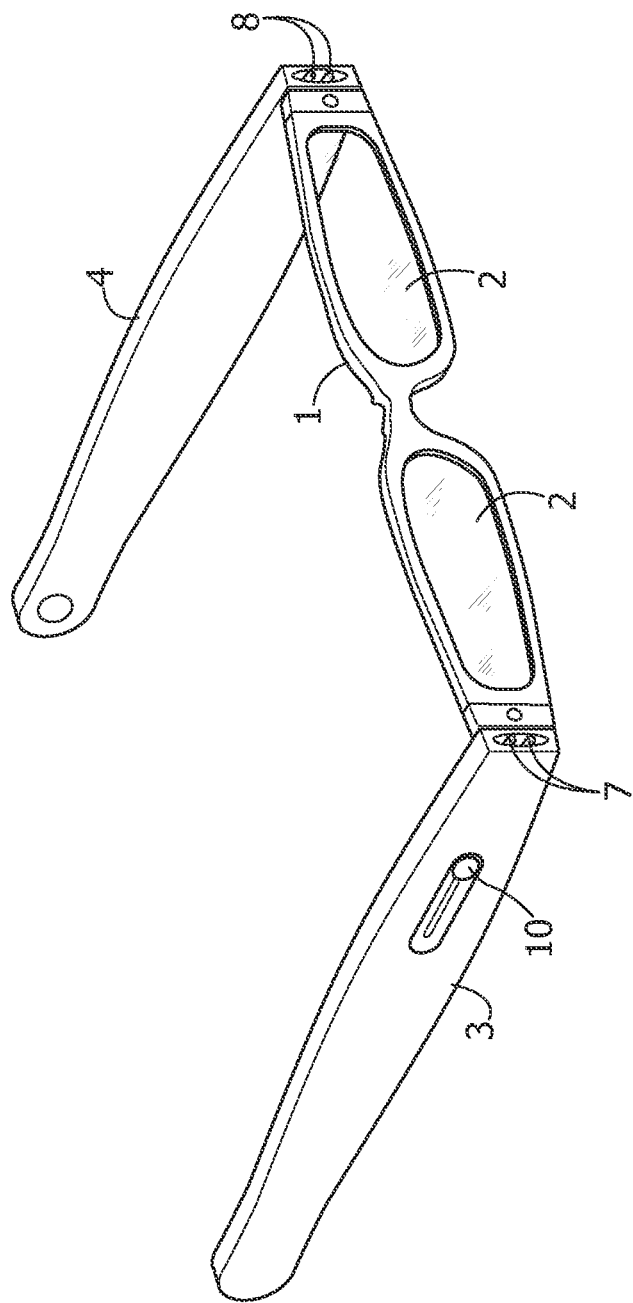
FIG. 1 is a perspective view that represents schematically one embodiment of the eyeglasses according to the invention.

It should be noted that the aesthetic configuration of the eyeglasses exemplified in FIG. 1 is not to be considered as in any way limiting, but should be understood simply as representing one of the multiple embodiments of eyeglasses designed to incorporate the peculiar characteristics of the invention.

Figure 2:
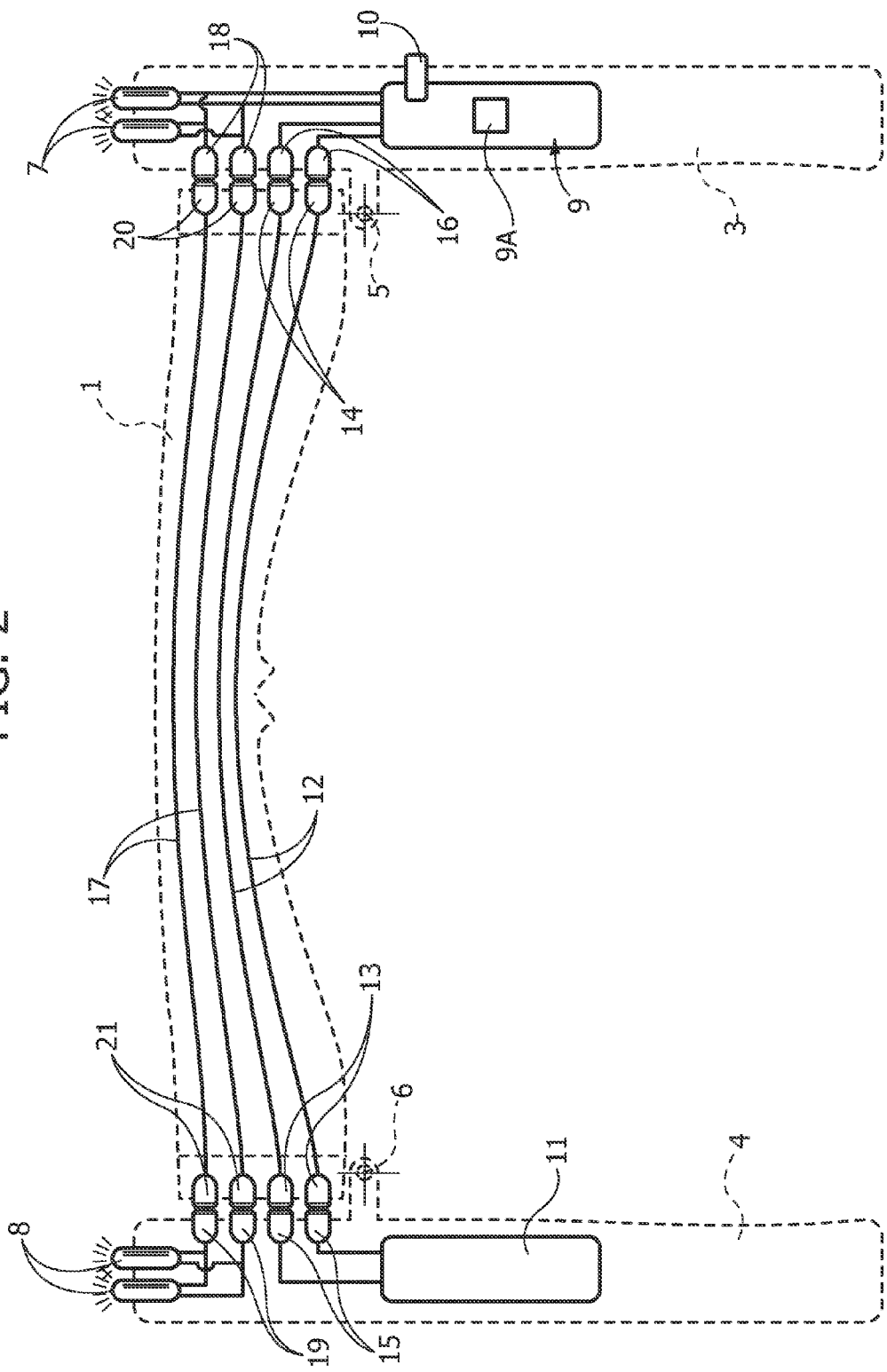
FIG. 2 is a schematic plan view that shows the electrical diagram of the lighting circuit and of the corresponding control means.

The eyeglasses represented in the example comprise, in a way in itself generally known, a front 1 bearing a pair of lenses 2, more in particular of the graduated reading type, and a pair of arms 3, 4 articulated to the sides of the front via respective hinges, designated as a whole by 5 and 6 in FIG. 2.

The arms 3, 4 are able to turn between the extended position of use represented in the figures, in which they extend substantially in a direction orthogonal to the front 1, and a folded position, in which they are laid against the front.

According to the invention, the eyeglasses incorporate a front lighting system to enable the user to read in conditions of poor lighting. Said lighting system comprises two pairs of LEDs (light-emitting diodes) surfacing from the ends where the arms 3, 4 are articulated to the front 1. The LEDs 7, 8 of each pair are arranged and oriented so as to generate a relatively wide light beam: as is illustrated in FIG. 1 (and unlike the scheme of FIG. 2) they are conveniently arranged in a configuration where they are set on top of one another.

The two pairs of LEDs 7, 8 are conveniently housed within respective recesses having a conical or curved shape, treated so as to present a highly reflecting surface in order to maximize light emission.

With reference to FIG. 2 the electrical circuit for activation and de-activation of the LEDs 7, 8 will now be described in detail.

Incorporated inside the arm 3 is an electronic card designated as a whole by 9, operatively associated to which is a manual selector 10, the functions of which will be described in greater detail in what follows. Incorporated inside the other arm 4 is a supply battery 11, conveniently of the lithium-polymer rechargeable type. The battery 11, which is accessible for being recharged through an openable hatch (not illustrated) present on the arm 4, is electrically connected to the electronic card 9 via first conductors 12 incorporated along the front 1 and coming under stationary contacts 13, 14 surfacing at the ends of the front 1. The stationary contacts 13, 14 are designed to co-operate with respective mobile contacts 15, 16 surfacing laterally from the arms 4, 3 in the proximity of the respective articulation hinges 6, 5.

The electronic card 9 is directly connected to the LEDs 7 carried by the arm 3, which are in turn connected to the LEDs 8 carried by the arm 4 through second conductors 17, which are likewise incorporated along the front 1, and via mobile contacts 18, 19 surfacing laterally from the arms 3, 4 in the proximity of the mobile contacts 16, 15. Said mobile contacts 16, 15 co-operate with respective stationary contacts 20, 21 surfacing from the ends of the front 1 in the proximity of the stationary contacts 14, 13.

With the arrangement described above, the electrical connection between the stationary contacts 14, 20 and the mobile contacts 16, 18 on the one hand, and between the stationary contacts 13, 21 and the mobile contacts 15, 19 on the other is obtained when the arms 3, 4 are set in the extended condition of use of the eyeglasses represented in the drawings, whereas said connection is interrupted when the arms 3, 4 are closed against the front 1.

The electronic card 9, which can be activated and de-activated manually via the selector 10 for controlling voluntary switching-on and switching-off of the LEDs 7, 8, incorporates an anti-dazzle device 9A provided for varying automatically the intensity of the light emitted when, in use, the eyeglasses are moved angularly upwards with respect to a reference angular position. Said automatic variation of intensity can consist in an instantaneous switching-off or else, more conveniently, in a fading from a condition of maximum lighting to a condition of minimum lighting or even of total switching-off of the LEDs 7 and 8.

According to the invention, said anti-dazzle device is constituted by a gyroscopic sensor of a microelectromechanical (MEMS) type 9A, for example of the type produced and marketed by STMicroelectronics under the trade name LYPR540AH or else under the trade name FC30.

The reference angular position corresponding to the condition of maximum light intensity and the angular position of switching-off or else of minimum light intensity generated by the LEDs 7, 8 can be both set, for example, via one and the same selector 10. The reference angular position will typically correspond to the inclination assumed by the eyeglasses when the user who wears them is reading, whereas the angular position of switching-off or of minimum intensity will correspond to the inclination assumed by the eyeglasses when the user turns his head upwards, for example to look at a person to whom he is speaking. The angular range of variation between the two positions may be, for example, in the region of 30°-40° or more.

The selector 10 may also be used for varying manually the light intensity of the LEDs 7, 8: in this case, in order to be able to perform all the functions described, said selector 10 may be able to turn between a position of switching-off and a position of switching-on of the control card 9, which can be displaced by being pressed for setting and selecting the reference angular position and the angular position of switching-off or of reduced intensity, and can be translated along the arm 3 for regulating manually said light intensity. Obviously, said functions may be activated via commands of a different type, even ones distinct and separate from one another.

The electronic card 9 can also incorporate a possible voice-recognition sensor to enable the user to identify the eyeglasses in the most immediate way in the case where they happen to get mislaid.

Of course, the details of construction and the embodiments may vary widely with respect to what has been described and illustrated herein, without thereby departing from the scope of the present invention as defined in the ensuing claims.

The invention claimed is:

1. Eyeglasses comprising: a front with a pair of lenses, a first arm and a second arm articulated to sides of the front via respective hinges, integrated lighting means for emitting light in front of the eyeglasses; means for activation and de-activation of the lighting means; and gyroscopic-sensor control means of the micro-electromechanical type configured for fading automatically an intensity of the light emitted by said lighting means when, in use, the eyeglasses are moved angularly upwards with respect to a reference angular position.

2. The eyeglasses according to claim 1, wherein said control means are designed to reduce the intensity of the light in a progressive way as far as an angular position of switching-off or of minimum intensity.

3. The eyeglasses according to claim 2, wherein said angular position of switching-off or of minimum intensity can be set via a manual selector.

4. The eyeglasses of claim 3, wherein the eyeglasses are reading glasses.

5. The eyeglasses according to claim 2, wherein the angular range between said reference angular position and said angular position of switching-off or of minimum intensity is substantially in a region of 30°-40° or more.

6. The eyeglasses according to claim 2, wherein said reference angular position can be set via a manual selector.

7. The eyeglasses according to claim 1, wherein said reference angular position can be set via a manual selector.

8. The eyeglasses according to claim 7, wherein said angular position of switching-off or of minimum intensity can be set via a manual selector.

9. The eyeglasses according to claim 1, wherein said lighting means comprise a pair of LEDs surfacing from an end where each arm is articulated to the front.

10. The eyeglasses according to claim 9, wherein said LEDs of each pair are set on top of one another.

11. The eyeglasses according to claim 10, wherein said first arm comprises said control means with said gyroscopic inclinometer and the second arm comprises a rechargeable supply battery, and for the electrical connection between said battery, said control means, and said LEDs stationary contacts are provided, arranged at sides of the front and interconnected by respective conductors incorporated within said front, and mobile contacts, which are carried by ends of the arms and co-operate with said stationary contacts during use of the eyeglasses.

12. The eyeglasses according to claim 9, wherein the first arm comprises said control means with said gyroscopic inclinometer and the second arm comprises a rechargeable supply battery, and for the electrical connection between said battery, said control means, and said LEDs stationary contacts are provided, arranged at the sides of the front and interconnected by respective conductors incorporated within said front, and mobile contacts, which are, carried by ends of the arms and co-operate with said stationary contacts during use of the eyeglasses.

13. The eyeglasses according to claim 1, further comprising a manual selector for manual switching-on/switching-off of said lighting means.

14. The eyeglasses according to claim 1, further comprising a manual selector for regulating the intensity of the light emitted by said lighting means.

15. Eyeglasses, comprising: a front with a pair of lenses, a first arm and a second arm articulated to sides of the front via respective hinges, an integrated lighting source for emitting light in front of the eyeglasses, and an actuator for activation and de-activation of the lighting means, a gyroscopic-sensor controller of a micro-electromechanical type coupled to the actuator and configured for fading automatically an intensity of the light emitted by said lighting source when the eyeglasses are moved angularly upwards with respect to a reference angular position.

\* \* \* \* \*